US005352930A

United States Patent [19]

Ratz

[11] Patent Number: 5,352,930

[45] Date of Patent: Oct. 4, 1994

[54] SYSTEM POWERED POWER SUPPLY USING DUAL TRANSFORMER HVAC SYSTEMS

[75] Inventor: James W. Ratz, Bloomington, Minn.

[73] Assignee: Honeywell Inc., Minneapolis, Minn.

[21] Appl. No.: 112,274

[22] Filed: Aug. 27, 1993

Related U.S. Application Data

[63] Continuation of Ser. No. 675,765, Mar. 27, 1991, abandoned.

[51] Int. Cl.⁵ ................ H02J 3/04

[52] U.S. Cl. ................ 307/43; 307/17; 165/26

[58] Field of Search ................ 307/17, 43, 68, 36, 307/82, 83, 39; 363/70; 165/26

[56] References Cited

U.S. PATENT DOCUMENTS

| | | | |
|---|---|---|---|
| Re. 31,502 | 1/1984 | Gingras | 361/170 |
| 3,566,072 | 2/1971 | Pierce | 219/135 |
| 3,663,828 | 5/1972 | Low et al. | 307/83 |
| 3,974,397 | 8/1976 | Killough, Jr. | 307/82 |
| 4,049,973 | 9/1977 | Lambert | 307/66 |
| 4,103,319 | 7/1978 | Crain et al. | |
| 4,197,997 | 4/1980 | Klebanoff | 307/39 X |
| 4,236,084 | 11/1980 | Gingras | 307/39 |
| 4,340,173 | 7/1982 | Kompelien | |
| 4,506,259 | 3/1985 | Rhodes | |
| 4,521,822 | 6/1985 | Simard | |
| 4,534,406 | 8/1985 | Newell, III et al. | 165/26 X |
| 4,555,753 | 11/1985 | Takahashi | 363/126 |
| 4,632,304 | 12/1986 | Newell, III et al. | |
| 4,667,186 | 5/1987 | Bliven | |
| 4,741,476 | 3/1988 | Russo et al. | |
| 4,776,514 | 10/1988 | Johnstone et al. | |
| 4,898,229 | 2/1990 | Brown et al. | 165/11.1 |
| 4,948,044 | 8/1990 | Cacciatore | 236/46 R |
| 4,948,987 | 8/1990 | Weber | 307/36 |
| 5,065,813 | 11/1991 | Berkeley et al. | 165/1 |
| 5,127,464 | 7/1992 | Butler et al. | 165/26 X |

FOREIGN PATENT DOCUMENTS

| | | |
|---|---|---|
| 410574 | 1/1991 | European Pat. Off. |
| 3905422 | 10/1989 | Fed. Rep. of Germany |

OTHER PUBLICATIONS

Millman, Jacob; "Microelectronics: Digital and Analog Circuits and Systems"; 1979; McGraw-Hill, Inc.; pp. 348-349; TK7874.M527.

Sedra, A. S. and Smith, K. C.; "Microelectronic Circuits"; 1982; CBS College Publishing; pp. 162-164; TK7867.S39.

*Primary Examiner*—A. D. Pellinen
*Assistant Examiner*—Fritz M. Fleming
*Attorney, Agent, or Firm*—Ian D. MacKinnon

[57] ABSTRACT

A power supply to supply power to a secondary system. The power supply is adapted to receive power from a plurality of primary systems. The power supply having a first rectifier which supplies power to the secondary system from a first primary system. At least one isolated rectifier which is connected to a primary system other than the first primary system. Wherein the primary system other than the first primary system provides power to the isolated rectifier. A power supply means connected to the first rectifier and the isolated rectifier. Wherein the rectifier and the isolated rectifier provide power to the power supply and the power supply provides power to the secondary system. Wherein due to the characteristic of the isolated rectifier, it is not possible to connect the first primary system out of phase with the primary system other than the first primary system, thereby eliminating unsafe voltages.

2 Claims, 3 Drawing Sheets

SYSTEM POWERED POWER SUPPLY USING DUAL TRANSFORMER HVAC SYSTEMS

This application is a continuation of application Ser. No. 07/675,765, filed Mar. 27, 1991, now abandoned.

FIELD OF THE INVENTION

This invention relates to low-voltage space thermostats which control operation of single-stage heating and cooling systems.

BACKGROUND OF THE INVENTION

Typically, in a single-stage heating and cooling system, the heating system includes a low-voltage operated gas valve which controls the flow of gas to the furnace; the cooling system includes a contactor having a low-voltage coil and high-voltage contacts, which contacts control energizing of the compressor; and the circulation system includes a fan relay having a low-voltage coil and high-voltage contacts, which contacts control energizing of the fan which circulates the conditioned air.

The electrical power for energizing such low-voltage operated devices is provided either by a single transformer or by two separate transformers. If the heating and cooling system is installed as a complete unit, generally a single transformer is provided. Such a single transformer has the required volt-ampere output to operate all the low-voltage operated devices. If the cooling system is installed separate from the heating system, generally an additional transformer is used.

Specifically, in a system for heating only, a fan relay is generally not provided since the fan is generally controlled directly by a thermal switch on the furnace. Therefore, it is common in a system for heating only that the only electrical load on the transformer is the gas valve. When such a heating system is used in combination with a cooling system, the electrical load increases due to the addition of the fan relay and the contactor. The existing transformer often does not have the required volt-ampere output to operate all the low-voltage operated devices, therefore, additional transformer load capacity for the cooling system is required. Often, a second independent transformer is utilized due to the increased electrical load requirements of the cooling system. Even if the first transformer has enough load capacity for heating and cooling systems, the second transformer is generally used so as to simplify the electrical wiring involved in the installation of the cooling system.

It is desirable that a low-voltage space thermostat for controlling a single-stage heating and cooling system be constructed so as to enable it to be readily usable with either the single-transformer or two-transformer power source. While use with the single-transformer power source poses no problem, a problem exists when used with the two-transformer power source. The problem is that the two transformers might be interconnected at the thermostat in such a manner so that they are out of phase with each other, whereby the voltages at the secondary windings are additive and thereby an unacceptably high value of voltage potential may exist between various nodes in the two systems. For typical transformers having a rated 24 volt RMS secondary voltage, this unacceptably high value is approximately 68 volts peak voltage.

One prior art approach to negating this problem has been to incorporate means for isolating the secondary windings of the two transformers from each other. For example, in a related art construction, typified in U.S. Pat. No. 4,049,973 to Lambert, five wiring terminals are provided in the thermostat. Two of the thermostat terminals, isolated from each other with respect to the internal circuitry of the thermostat by a multi-position system selector switch, are normally connected together at the terminals by a removable wire jumper. When the heating and cooling system uses a single transformer, the wire jumper is retained, and one end of the secondary winding of the single transformer is connected to one of the two jumper-connected terminals. The other end of the secondary winding is connected through the fan relay, gas valve, and contactor to the remaining three terminals. When the heating and cooling system uses two transformers, the wire jumper is removed, and one end of the secondary winding of the first transformer is connected to one of the two terminals previously connected by the wire jumper. Further, one end of the secondary winding of the second transformer is connected to the other of the two terminals previously connected by the wire jumper. The other end of the secondary winding of the first transformer is connected through the gas valve to one of the three remaining terminals, and the other end of the secondary winding of the second transformer is connected through the fan relay and contactor to the remaining two terminals. Since the two terminals previously connected by the wire jumper are isolated from each other, the secondary windings of the two transformers are therefore also isolated from each other.

A second approach for solving the aforementioned problem is described in U.S. Pat. No. 4,898,229 to Brown et al. Brown et al. uses an integral circuit means to detect the existence of an unacceptably high voltage potential between the two wiring terminals. If an unacceptably high voltage potential is detected, the circuit means alerts the party installing the second transformer that the two transformers are out of phase. However, utilizing this method requires the installer to reverse the connection at the terminals. If the installer ignores the alert, the high-voltage potential is still present. Further, Brown et al. interconnects the heating and cooling transformers at terminal R of FIG. 1. This interconnection is undesirable, as the National Electrical Code discourages such a connection. Applicant's invention is an alternative to Brown et al. and Lambert, in which the polarity of the transformers is not of concern, due to the use of full-wave rectifiers in the first embodiment and the isolation of the cooling system from the heating system by means of an isolation transformer for the second embodiment.

SUMMARY OF THE INVENTION

This invention is a power supply for supplying power from a plurality of primary systems to a secondary system. The power supply is adapted to receive power from a plurality of primary systems.

This invention is primarily directed toward single-stage heating and cooling systems. The heating systems include low voltage operated gas valves which control the flow of gas to the furnace. The low voltage gas valve is supplied with power from a first transformer which is connected in series to a gas valve and through a series of relays and switches located in the thermostat. The cooling system includes a contactor having a low voltage coil and high voltage contacts, which contacts control energizing of the compressor. Further, the cooling system may include a fan relay having a low voltage coil and high voltage contacts, which contacts control energizing of the fan which circulates the conditioned air. The cooling system, therefore, also has a transformer which supplies voltage in series to a cooling load and a system of relays and switches also located in the thermostat.

For one embodiment of the invention, the relay and switches are connected in parallel with a full-wave rectifier for the heating system. When the relay and switches are closed the full-wave rectifier is shorted out. The thermostat, which is the secondary system, receives power from the full-wave rectifier when the relay or switches are open. The relay and switches for the cooling system are connected in parallel with an isolation transformer. The isolation transformer isolates a second full-wave rectifier from the cooling system. In a simpler embodiment, the cooling system is electrically connected to the second full-wave rectifier in a similar manner as the heating system. The two full-wave rectifiers are connected in parallel through a current limiter to a power supply. In this manner, when the heating system is on, for example, the full-wave rectifier connected to the heating system is shorted out and the thermostat receives power only from the cooling system. A current limiter is utilized to prevent the cooling system from operating due to the current flow through the full-wave rectifier. The current limiter allows only leakage current to flow through the cooling system.

If, however, both the heating system and the cooling system are off, the thermostat receives power from both the heating system and the cooling system. If the transformer from the cooling system is not connected through the full-wave rectifier and the transformer from the heating system is out of phase, a potential 68 volt peak voltage differential can be achieved. Therefore, to prevent this possibility, this invention incorporates the full-wave rectifiers and the isolating transformer. By connecting the isolating transformer in parallel with the switches and relay located in the thermostat for operation of the cooling system the high potential and the interconnection cannot be achieved. When the cooling system is energized, the isolation transformer is shorted out thus, in effect, removing it from the circuit. When the cooling system is off, the isolation transformer is able to provide power to the full-wave rectifier, yet the isolation transformer prevents the possibility of the 68 volts peak voltage differential from existing. The isolation transformer eliminates any interconnection of the heating and cooling system transformers, thus preventing any possibility of experiencing the 68 volt peak voltage.

DESCRIPTION OF THE PREFERRED EMBODIMENT

Figure 1:
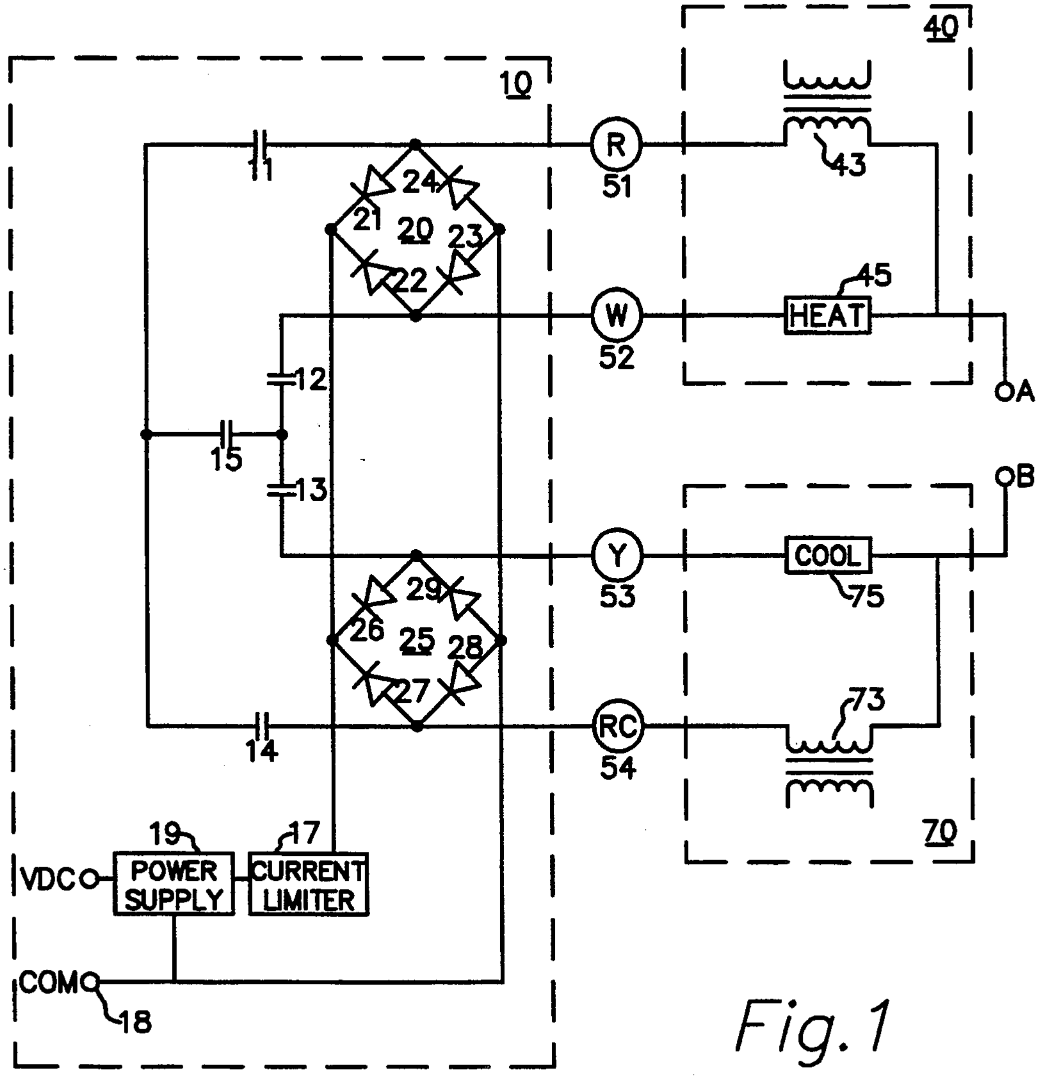
FIG. 1 illustrates a first embodiment of a wiring scheme in which the heating and cooling system may be connected to the thermostat.

FIG. 1 is utilized to illustrate a means to eliminate the high voltage potential. FIG. 1 is a heating and cooling system in which heating system 40 and cooling system 70 are provided with power from transformers 43 and 73, respectively. Heating system 40 is connected to thermostat 10 through terminals 51 and 52, whereas cooling system 70 is connected to thermostat 10 through terminals 53 and 54. Terminals 51, 52, 53, and 54 are also designated with the standardized terminal designations R, W, Y, and RC, respectively. If cooling system 70 did not provide its own transformer 73, the cooling system could operate by sharing transformer 43 and connecting the terminals at nodes A and B. To operate thermostat 10 in this manner, terminals 54 and 51 would then be jumpered together. However, for this example both the heating system 40 and the cooling system 70 will have their own transformers 43 and 73, respectively. Thermostat 10 operates by turning heating system 40 or cooling system 70 on through a series of switches 11, 12, 13 and 14, and main relay 15. When switches 11, 12 and relay 15 are closed, the heating system operates. When switches 11 and 12 are open or relay 15 is open, heating system 40 does not operate. This system also works in the same manner for cooling system 70, wherein when switches 13 and 14, along with relay 15, are all closed, cooling system 70 operates. However, when switches 13 and 14 are open or relay 15 is open, cooling system 70 will not operate.

Thermostat 10 receives power from power supply 19. Power supply 19 receives power from rectifiers 20 and 25 through current limiter 17. Power supply 19 converts the rectified power from rectifiers 20 and 25 to a DC power signal to power thermostat 10. When either heating system 40 or cooling system 70 are not operating (switches 11 and 12 are open, or 13 and 14 are open) power is supplied through the rectifiers 20 and 25. Rectifiers 20 and 25 are connected to heating system 40 and cooling system 70 in parallel with switches 11, 12 and relay 15, and switches 13, 14 and relay 15, respectively. Therefore, if the cooling system was operating and the heating system was not operating, switches 11 and 12 would be open, putting full-wave rectifier 20 in series with transformer 43 and heating load 45 of heating system 40, therein power could be transmitted through full-wave rectifier 20. For this embodiment, full-wave rectifier 20 comprises a diode bridge comprising diodes 21, 22, 23 and 24. Power is then transmitted from full-wave rectifier 20 through current limiter 17 to power supply 19. Current limiter 17 prevents the current being transmitted through full-wave rectifier 20 from reaching a level in which heating system 40 would, in effect, turn on. Thus, current limiter 17 only allows leakage current through heating load 45.

Should heating system 40 be operating, wherein switches 11 and 12, plus relay 15, are all closed and cooling system 70 is not operating, switches 13 and 14 being open, the thermostat would receive power in a similar manner as previously described; however, the power would be provided from cooling system 70 and full-wave rectifier 25 would be in series with transformer 73 and cooling load 75. Full-wave rectifier 25 comprises a diode bridge made up of diodes 26, 27, 28 and 29.

If, however, neither heating system 40 nor cooling system 70 are operating, in other words, switches 11, 12, 13 and 14 are open, or relay 15 is open, thermostat 10 will receive power from both heating system 40 and cooling system 70. In this case, if transformers 43 and 73 are running at 24 volts RMS, it is possible to achieve a 24 volt RMS differential. This voltage differential would be located between nodes A and B or, in other words; between the nodes where cooling load 75 and transformer 73 are connected and the node where heating load 45 and transformer 43 are connected. This is possible if transformers 43 and 73 are connected out of phase. For example, if the transformer 43 was in a position where terminal 51 were to be positive, current would flow through diode 21 to power supply 19, through power supply 19 to common node 18, back through common node 18 to diode 28, through diode 28 to terminal 54 to transformer 73, thus permitting an electrical connection. This only happens when terminal 54 at that time is negative, it is then possible to create only a 24 volt RMS differential between nodes A and B. While this is an acceptable voltage differential, an interconnection between the transformers is not desired. If, however, terminals 51 and 54 were connected together as shown in Brown et al., a 68 volt peak voltage would be present between nodes A and B.

When cooling system 70 does not provide its own transformer 73, as previously discussed, cooling load 75 operates by sharing transformer 43 with heating load 45. Nodes A and B are electrically connected and terminals 54 and 51 are jumpered together, diodes 27 and 28 thereby become redundant with diodes 21 and 24, respectively. Therefore, in a system where one transformer is utilized to power the heating load and the cooling load it is possible to remove diodes 27 and 28 from rectifier 25 of FIG. 1. In this manner, transformer 43 and heating load 45 are connected in series with diode bridge 20 to provide power, as previously discussed, to power supply 19. Cooling load 75 is connected to half of rectifier 25, such that diodes 26 and 29 rectify current from cooling load 75, with diodes 21 and 24 of diode bridge 20, completing the electrical circuit to transformer 43.

Applicant's second embodiment provides a means in which it is impossible for an electrical connection to be had between transformers 43 and 73.

Figure 2:
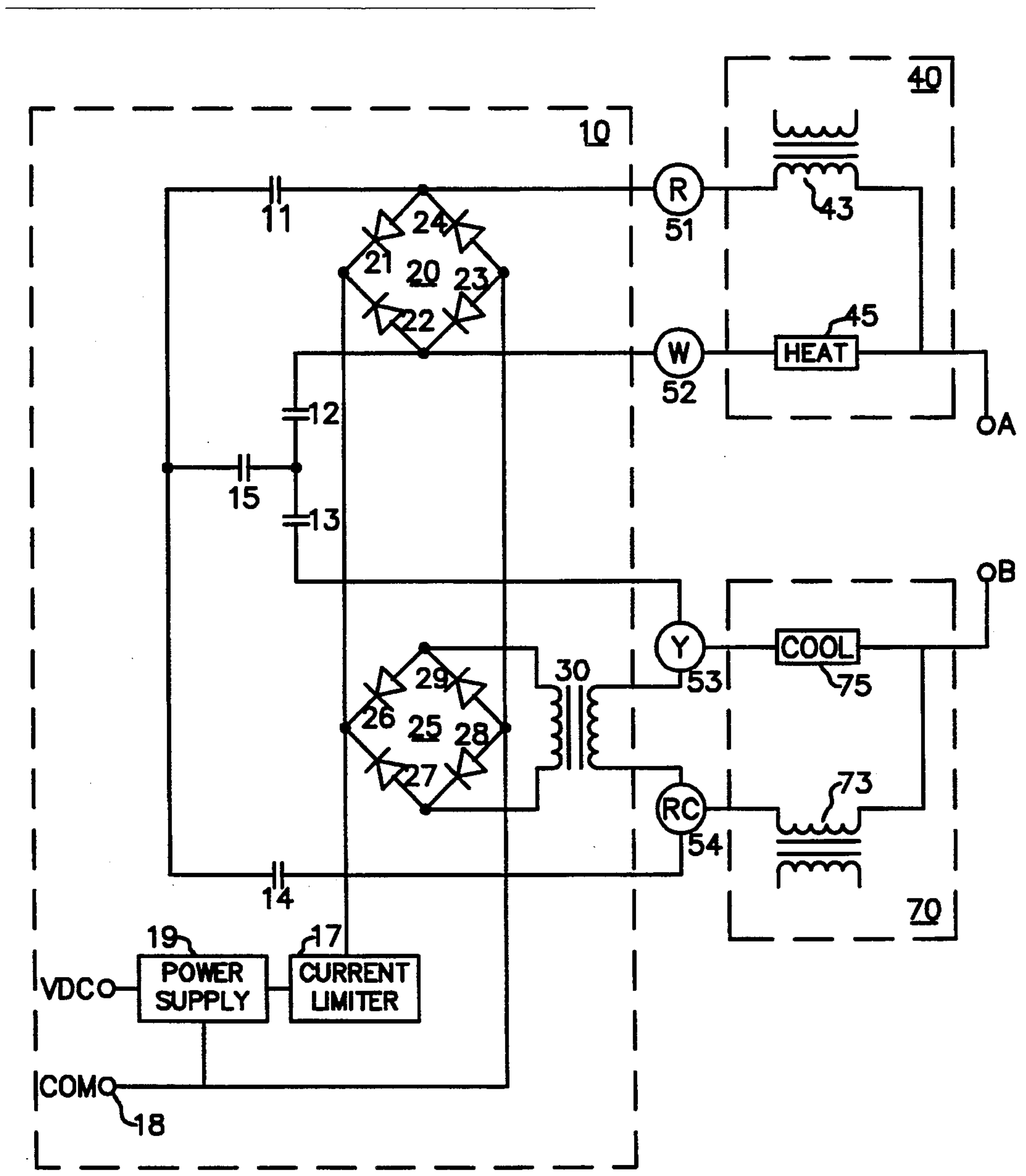
FIG. 2 is a second embodiment of the invention.

FIG. 2 demonstrates the second embodiment of this invention. As shown, the electrical circuit of FIG. 2 is quite similar to FIG. 1. The main difference between FIG. 1 and FIG. 2 is the addition of an isolating transformer 30 to full-wave rectifier 25. By removing the direct connections to terminals 53 and 54 to full-wave rectifier 25 and inserting between them isolating transformer 30, the possibility of interconnecting transformers 43 and 73 is eliminated.

Isolation transformer 30 is connected in parallel with switches 13, 14 and relay 15. In this manner, when switches 13, 14 and relay 15 are all closed, isolation transformer 30 is, in essence, shorted out. However, when switches 13 and 14, or relay 15, are open, isolation transformer 30 is in series with transformer 73 and cooling load 75. Isolation transformer 30 is a one-to-one transformer. However, in a system where neither heating system 40 or cooling system 70 are operating, as previously discussed in the background, it is possible to have a voltage differential of 68 volts peak voltage. By the introduction of isolation transformer 30 and use of full-wave rectifier 25, which is a diode bridge, there will be no interconnection of cooling transformer 73 with heating transformer 43. As it is no longer possible for an installer to connect cooling transformer 73 out of phase with heating transformer 43, this system becomes simpler to correctly install and safer to use.

FIG. 2, which is the preferred embodiment, demonstrates a system in which only two primary system transformers are utilized. However, if one were to desire adding additional systems, it would be possible to add these additional systems provided these systems are added utilizing the full-wave rectifier and isolation transformer system to connect the new system to the secondary power supply or thermostat 10 of FIG. 2. Therefore, it is possible to utilize a plurality of systems and eliminate the possibility of interconnecting any of the transformers so that the phasing of the transformers is immaterial.

Figure 3:
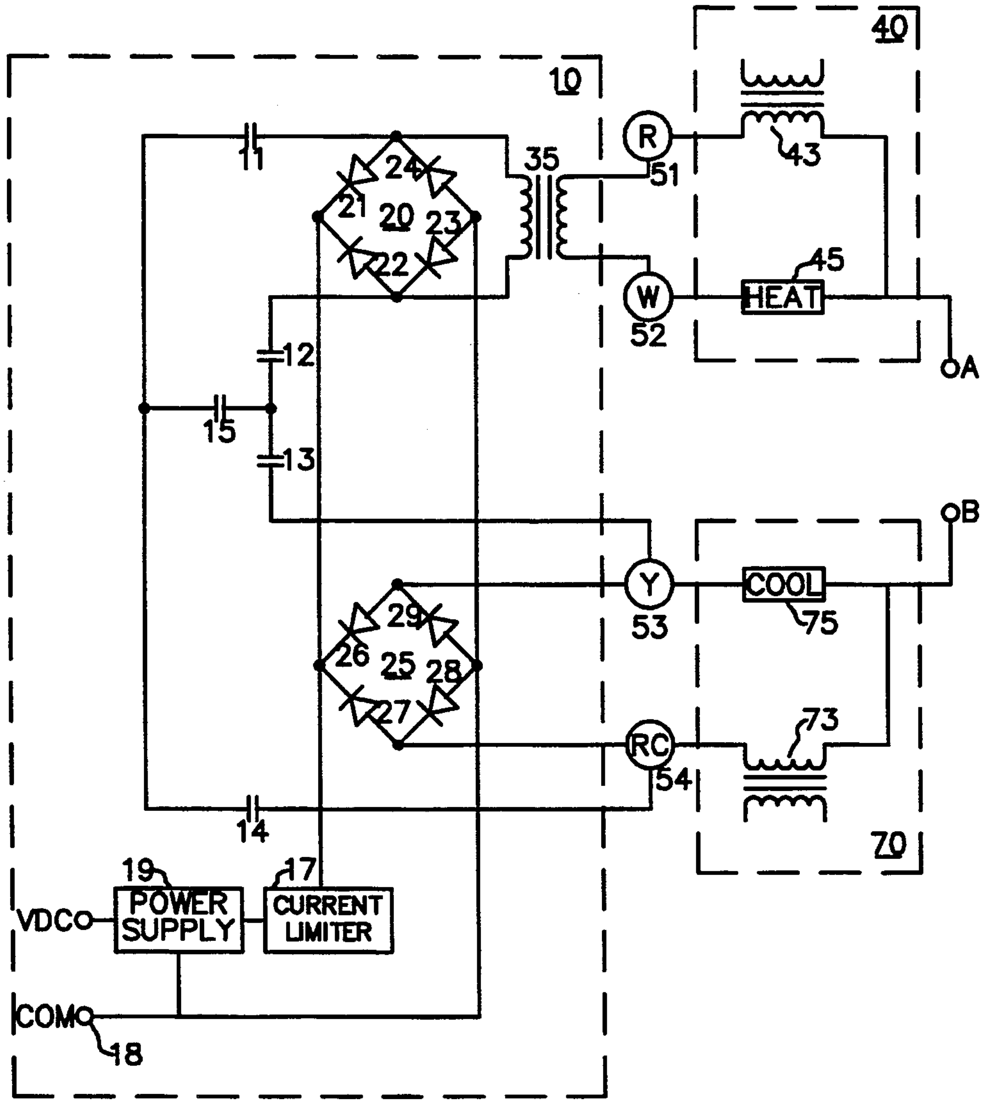
FIG. 3 is a third embodiment of the invention.

FIG. 3 is a modification of FIG. 2 utilizing the same designations. Isolation transformer 30 of FIG. 2 has been removed and isolation transformer 35 is utilized as described in FIG. 2; however, isolation transformer isolates heating load 45 and transformer 43.

I claim:

1. A power supply for a thermostat, the thermostat for controlling a heating system and a cooling system, said power supply receiving power from the heating system and the cooling system, the heating system and the cooling system being powered by separate A.C. power sources, said power supply comprising:

a first diode bridge electrically connected to the heating system, said first diode bridge having two input nodes and first and second output nodes wherein said heating system is electrically connected to said input nodes of said first diode bridge;

a second diode bridge electrically connected to the cooling system, said second diode bridge having two input nodes and first and second output nodes, wherein said cooling system is electrically connected to said input nodes of said second diode bridge;

means for providing power to said thermostat, having a current limiter and a power supply means, said first output node of said first diode bridge electrically connected to said first output node of said second diode bridge, said second output node of said first diode bridge electrically connected to said second output node of said second diode bridge, said first output node of said first diode bridge electrically connected to said current limiter, said second output node of said first diode bridge electrically connected to said power supply means, said current limiter electrically connected to said power supply means, wherein said power supply means converts rectified power from said first diode bridge and said second diode bridge to D.C. power to power the thermostat, wherein said first diode bridge and said second diode bridge electrically isolate said heating system and said cooling system;

an isolation transformer electrically connected between said input nodes of said first diode bridge and said heating system; and first and second switch means, said first switch means electrically connected across said input nodes of said first diode bridge, said second switch means electrically connected across said input nodes of said second diode bridge, wherein said first and said second switch means activate said heating and cooling systems respectively.

2. A power supply for a thermostat, the thermostat for controlling a heating system and a cooling system, said power supply receiving power from the heating system and the cooling system, the heating system and the cooling system being powered by separate A.C. power sources, said power supply comprising:

a first diode bridge electrically connected to the heating system, said first diode bridge having two input nodes and first and second output nodes wherein said heating system is electrically connected to said input nodes of said first diode bridge;

a second diode bridge electrically connected to the cooling system, said second diode bridge having two input nodes and first and second output nodes, wherein said cooling system is electrically connected to said input nodes of said second diode bridge;

means for providing power to said thermostat, having a current limiter and a power supply means, said first output node of said first diode bridge electrically connected to said first output node of said second diode bridge, said second output node of said first diode bridge electrically connected to said second output node of said second diode bridge, said first output node of said first diode bridge electrically connected to said current limiter, said second output node of said first diode bridge electrically connected to said power supply means, said current limiter electrically connected to said power supply means, wherein said power supply means converts rectified power from said first diode bridge and said second diode bridge to D.C. power to power the thermostat, wherein said first diode bridge and said second diode bridge electrically isolate said heating system and said cooling system;

an isolation transformer electrically connected between said input nodes of said second diode bridge and said cooling system; and first and second switch means, said first switch means electrically connected across said input nodes of said first diode bridge, said second switch means electrically connected across said input nodes of said second diode bridge, wherein said first and said second switch means activate said heating and cooling systems respectively.

* * * * *